United States Patent [19]

Wright et al.

[11] Patent Number: 5,676,430

[45] Date of Patent: Oct. 14, 1997

[54] DEVICE FOR ATTACHING A WHEEL LINER TO A WHEEL HAVING A HUB COVER

[75] Inventors: James P. Wright; Timothy L. Bates; Kevin D. Nash; Barry Lynn Roberts, all of Cookeville; John Davenport, Crossville, all of Tenn.

[73] Assignee: Phoenix USA, Inc., Cookeville, Tenn.

[21] Appl. No.: 642,498

[22] Filed: May 3, 1996

[51] Int. Cl.⁶ ........................................ B60B 7/10
[52] U.S. Cl. .................... 301/108.4; 301/37.31; 301/37.37
[58] Field of Search ............... 301/37.1, 37.31, 301/37.34, 37.37, 37.42, 108.1, 108.4, 37.26

[56] References Cited

U.S. PATENT DOCUMENTS

| | | | |
|---|---|---|---|
| 2,166,216 | 7/1939 | Lyon | 301/37.37 |
| 2,183,220 | 12/1939 | Horn | 301/37.31 |
| 2,526,026 | 10/1950 | Horn | 301/37.34 |
| 4,470,638 | 9/1984 | Bartylla | 301/37.37 X |
| 4,626,037 | 12/1986 | Kushner | 301/108.4 |
| 4,761,040 | 8/1988 | Johnson | 301/37.37 |
| 5,061,014 | 10/1991 | Polka | 301/108.1 |
| 5,263,770 | 11/1993 | Goudey | 301/108.4 X |
| 5,358,313 | 10/1994 | Polka | 301/108.4 X |
| 5,366,279 | 11/1994 | Polka | 301/108.1 |

FOREIGN PATENT DOCUMENTS 256843  6/1928  Italy .................................... 301/37.37

*Primary Examiner*—Russell D. Stormer
*Attorney, Agent, or Firm*—Waddey & Patterson; Edward D. Lanquist, Jr.

[57] ABSTRACT

The present invention discloses a device for attaching a wheel liner to a wheel having a hub. In both preferred embodiments, a spring clip is attached to a hub. The spring clip then has a biased finger which can engage a hub cover fictionally and hold it in place. However, this biased finger also allows the hub cover to be easily removed. In the first preferred embodiment, the spring clip is attached either at a screw on the hub, under a ring attached to the screws on the hub, or attached to the screws under a ring on the hub. The second embodiment attaches to a lip of the hub.

2 Claims, 7 Drawing Sheets

DEVICE FOR ATTACHING A WHEEL LINER TO A WHEEL HAVING A HUB COVER

APPLICATION FOR UNITED STATES LETTERS PATENT

Be it known that we, James P. Wright, a citizen of the United States, residing at 1060 Robin Lane, Cookeville, Tenn. 38501; Timothy L. Bates, a citizen of the United States, residing at 627 Rice Circle, Apartment #18, Cookeville, Tenn. 38501; Kevin D. Nash, a citizen of the United States, residing at 2692 Morris Lane, Cookeville, Tenn. 38501; Barry Lynn Roberts, a citizen of the United States, residing at 920 Fox Ridge Road, Cookeville, Tenn. 38501; and John Davenport, a citizen of the United States, residing at 108 S. Lake Point Court, Crossville, Tenn. 38555, have invented a new and useful "Device for Attaching a Wheel Liner to a Wheel Having a Hub."

BACKGROUND OF THE INVENTION

The present invention relates generally to a decorative wheel trim system and more particularly to a system for releasably attaching a wheel liner such as a hub cover to a rear wheel.

It will be appreciated by those skilled in the art that rear wheels have distinctive hub configurations. These hubs are unsightly. As a result, owners desire to cover these hubs with decorative items. Unfortunately, these hubs must be easily accessed so that the hub can be properly oiled and maintained.

To this end, U.S. Pat. No. 5,366,279 discloses the use of a foam sleeve placed around the hub to hold a hub cover in place. Unfortunately, as the hub becomes heated, the foam piece acts as an insulator holding in the heat. This process causes a loss of resilience in the foam. Additionally, over time, it is anticipated that such a foam sleeve will fail as it is heated and cooled. What is needed, then, is a device for attaching a wheel liner to a rear hub. This needed system must use a material that is more difficult to fatigue and fail. This needed system must allow easy access to the hub. This needed system must take advantage of the hub configurations. This needed system is presently lacking in the prior art.

SUMMARY OF THE INVENTION

The present invention discloses a device for attaching a wheel liner to a wheel having a hub. In the preferred embodiments, a spring clip is attached to a hub. The spring clip then has a biased finger which can engage a hub cover frictionally and hold it in place. This finger could be coated to increase friction between biased member and hub cover. However, this biased finger also allows the hub cover to be easily removed. In the first and second preferred embodiments, the spring clips are attached under the screws on the hub. The third embodiment attaches to the lip of the hub.

Accordingly, one object of the present invention is to provide a device for attaching a wheel liner to a wheel having a hub.

Still another object of the present invention is to provide a device for releasibly attaching a hub cover to a hub to allow easy removal and access to the hub.

Another object of the present invention is to provide a system for releasably attaching a wheel liner to a hub that does not fail over time.

Another object of the present invention is to provide a device which takes advantage of the configuration of the hubs.

DESCRIPTION OF THE PREFERRED EMBODIMENT

Figure 1:
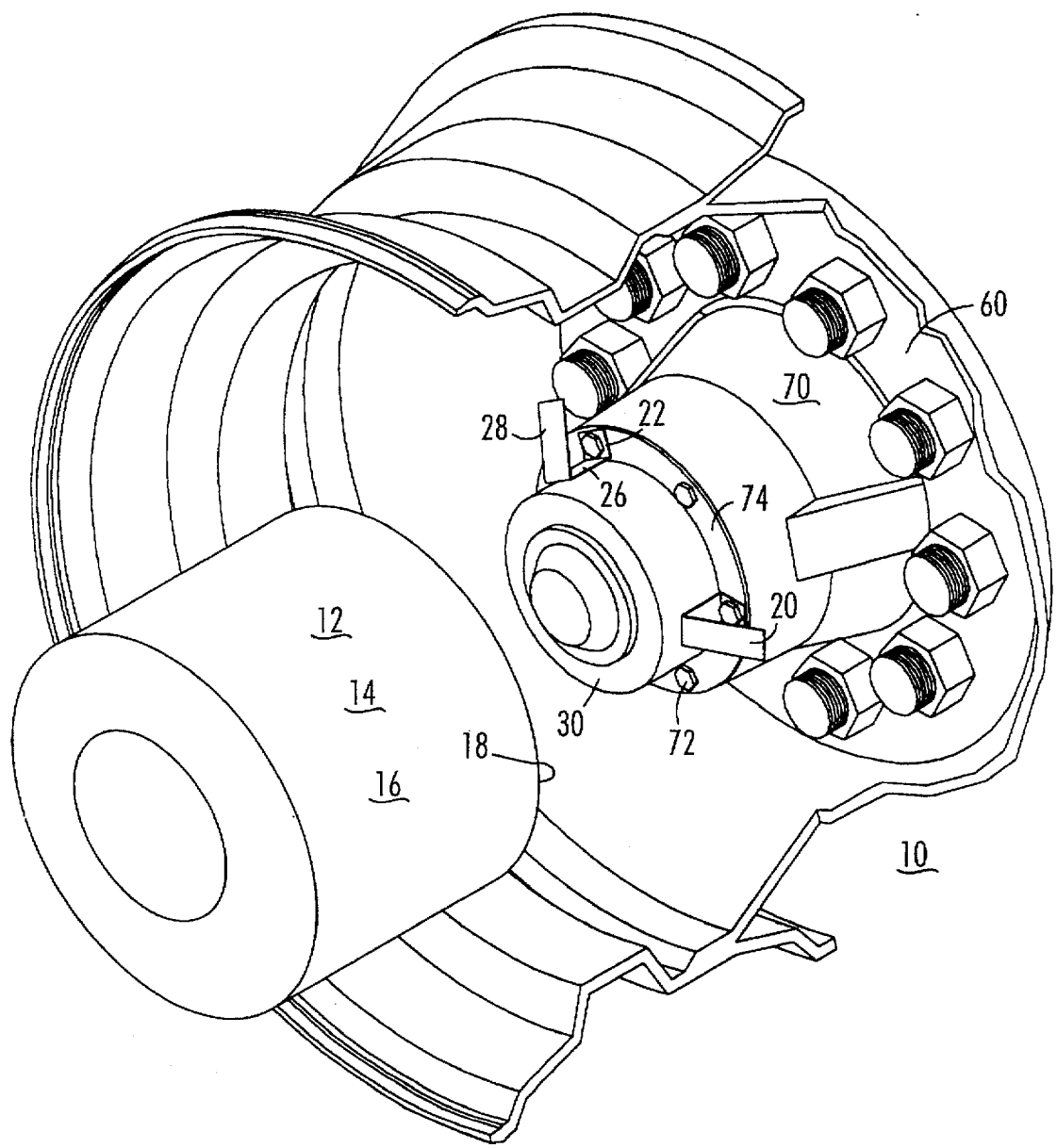
FIG. 1 is a perspective exploded view of one embodiment of the device of the present invention.

Referring now to FIG. 1, there is shown generally at 10 the device for attaching a wheel liner to a wheel having a hub. In the preferred embodiment, the wheel liner is a hub cover. In this particularly configuration, wheel 60 has hub 70 which has plural bolts or screws 72 attached on a ridge 74. In this particular embodiment, clip 20 having base 22 is secured to ridge 74 by placing screws 72 through mounting orifices 24 in base 22. Clip 20 also has support 26 which passes from ridge 74 along hub 70 until it reaches finger 28. Finger 28 is biased which allows finger 28 to frictionally grasp or attach wheel liner 12 which is preferably hub cover 14 in such a manner to allow wheel liner 12 to remain on covering hub 70 until user desires to remove it to access hub 70 for maintenance purposes.

Figure 2:
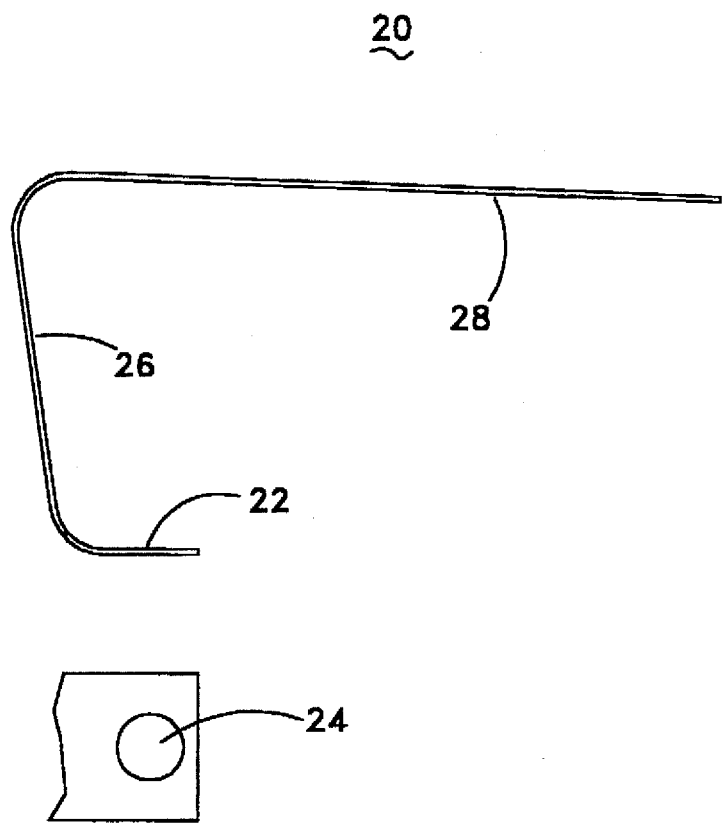
FIG. 2 is a plan view of the first embodiment of the clip.

Referring now to FIG. 2, there is shown generally at 20 the clip of the present invention. Clip 20 has base 22 having hole 24. Wheel liner 12 having outer wall 16 and seamless inner wall 18. Fingers 28 frictionally and releasibly engage inner wall 18. Clip 20 also has finger 28. Support 26 joins finger 28 to base 22. In the preferred embodiment, finger 28 is substantially 76.2 mm long. In the preferred embodiment, base 22 is substantially 15 mm long. In the preferred embodiment, hole 24 has a radius of 7.2 mm. In the preferred embodiment, angle between base 22 and support 26 is substantially 98° with a radius of 5 mm. The angle between support 26 and finger 28 is substantially 80° with a radius of 5 mm.

Figure 3:
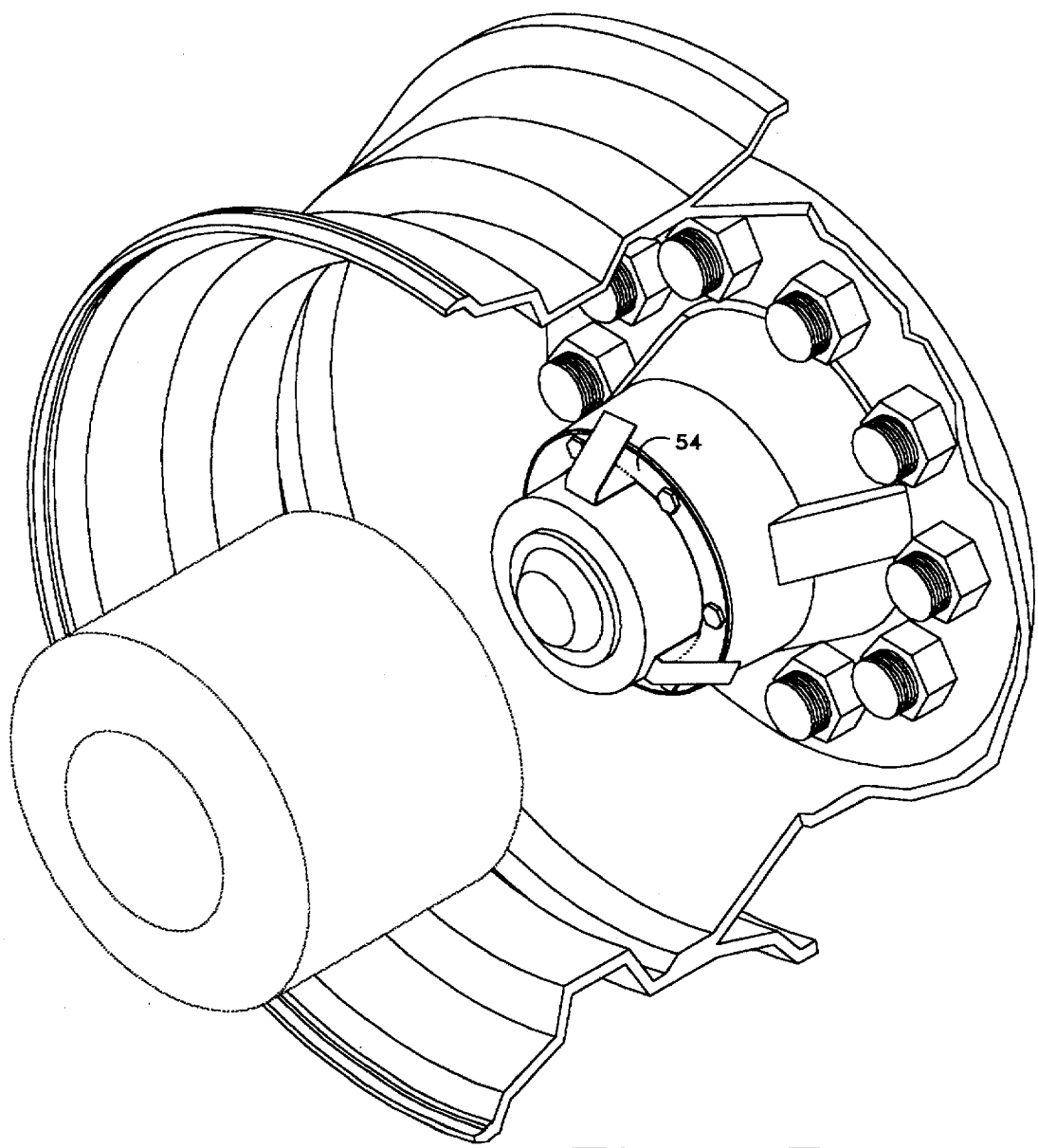
FIG. 3 is an exploded isometric view of the second embodiment of the present invention.
Figure 4:
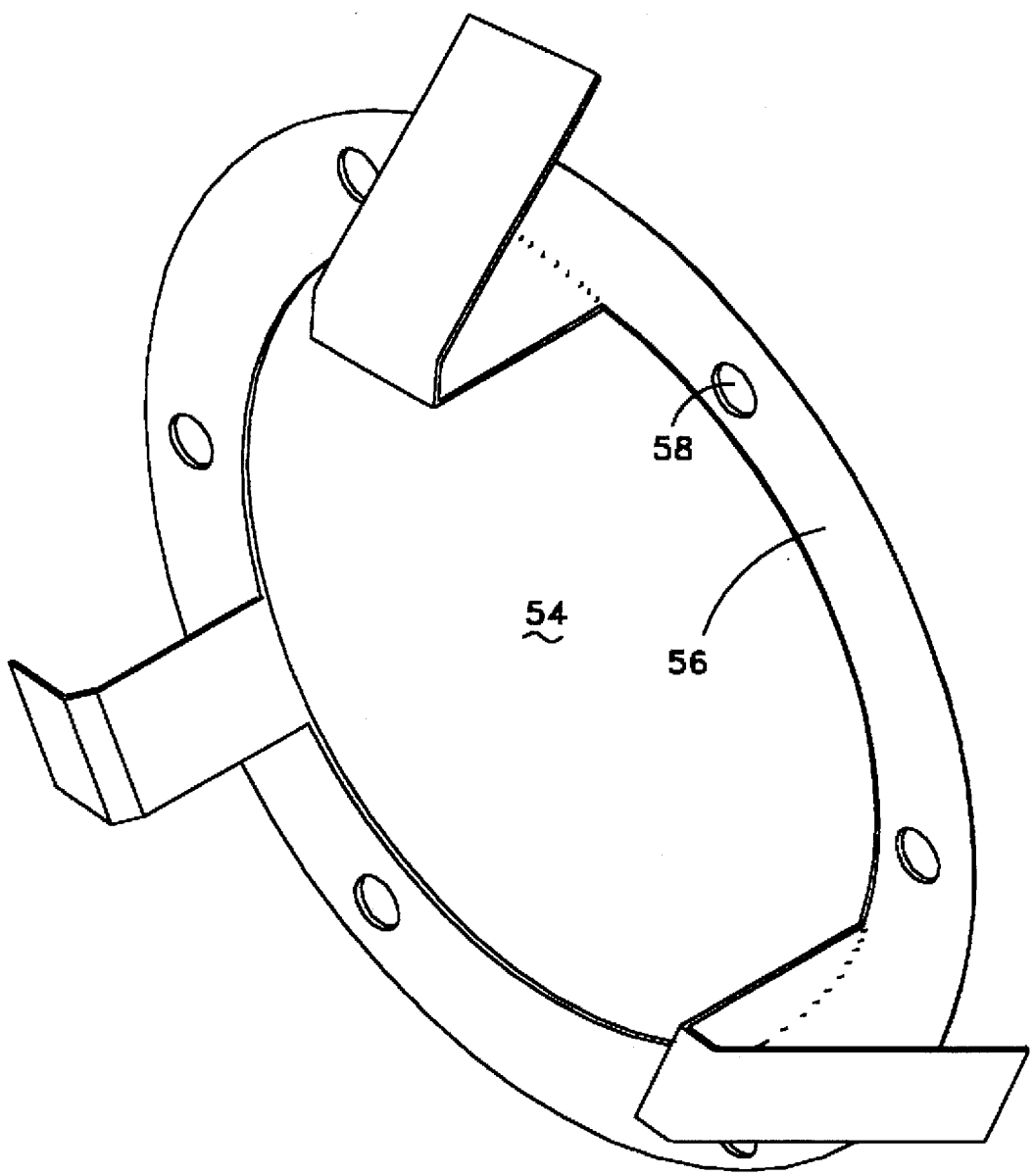
FIG. 4 is an isometric view showing the second embodiment of the present invention.

Referring now to FIGS. 3 and 4 there is shown that 3 clips 20 are attached to each other by base 56. Base 56 has mounting orifices 58 to accept bolts 72.

Figure 5:
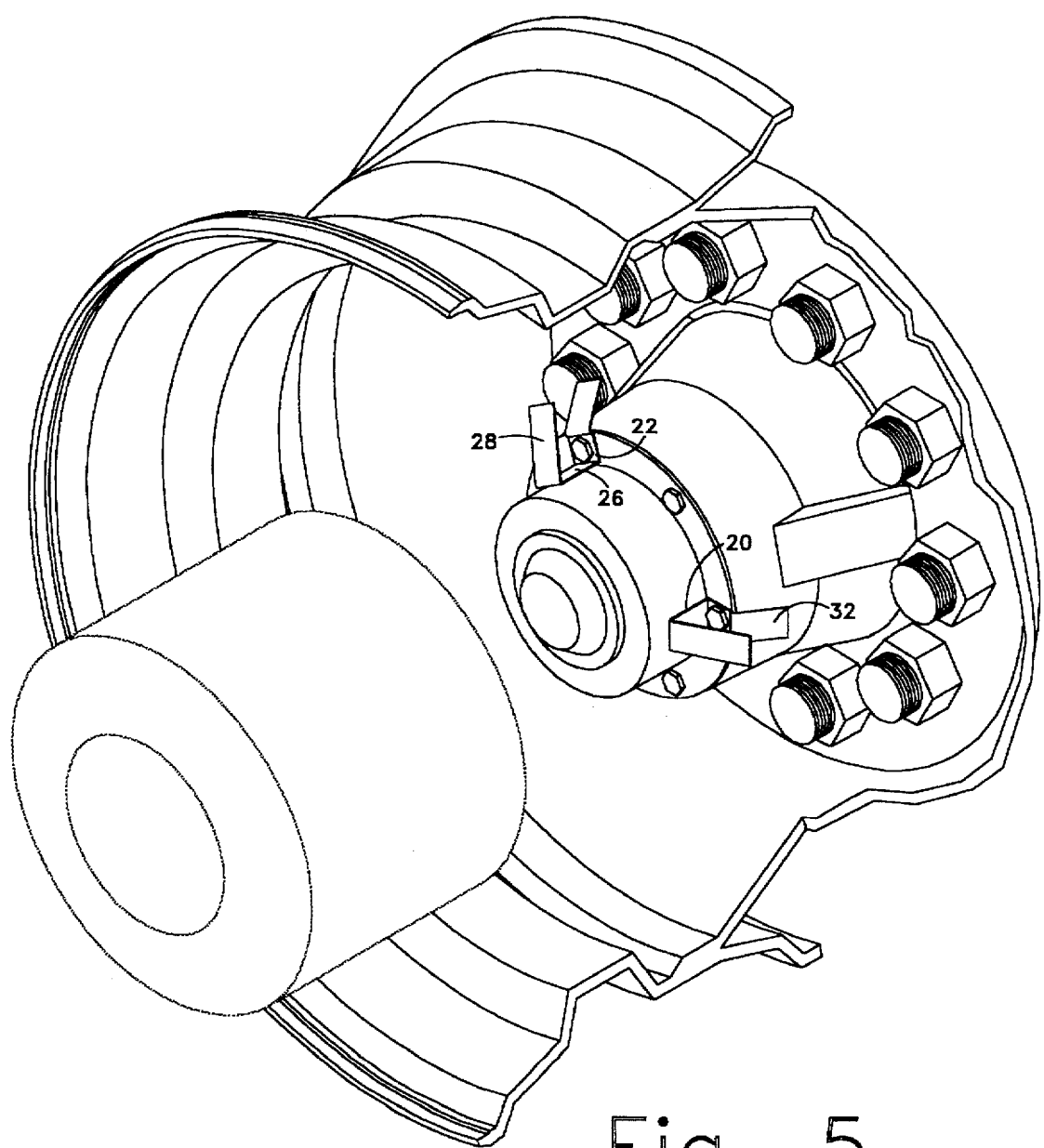
FIG. 5 is an exploded isometric view showing the clip attached to a bolt on the hub.

Referring now to FIG. 5, there is shown a slightly different embodiment of the clip shown in FIGS. 1–4. In this particular embodiment, flange 32 is added to base 22 thereby providing additional fictional support.

Figure 6:
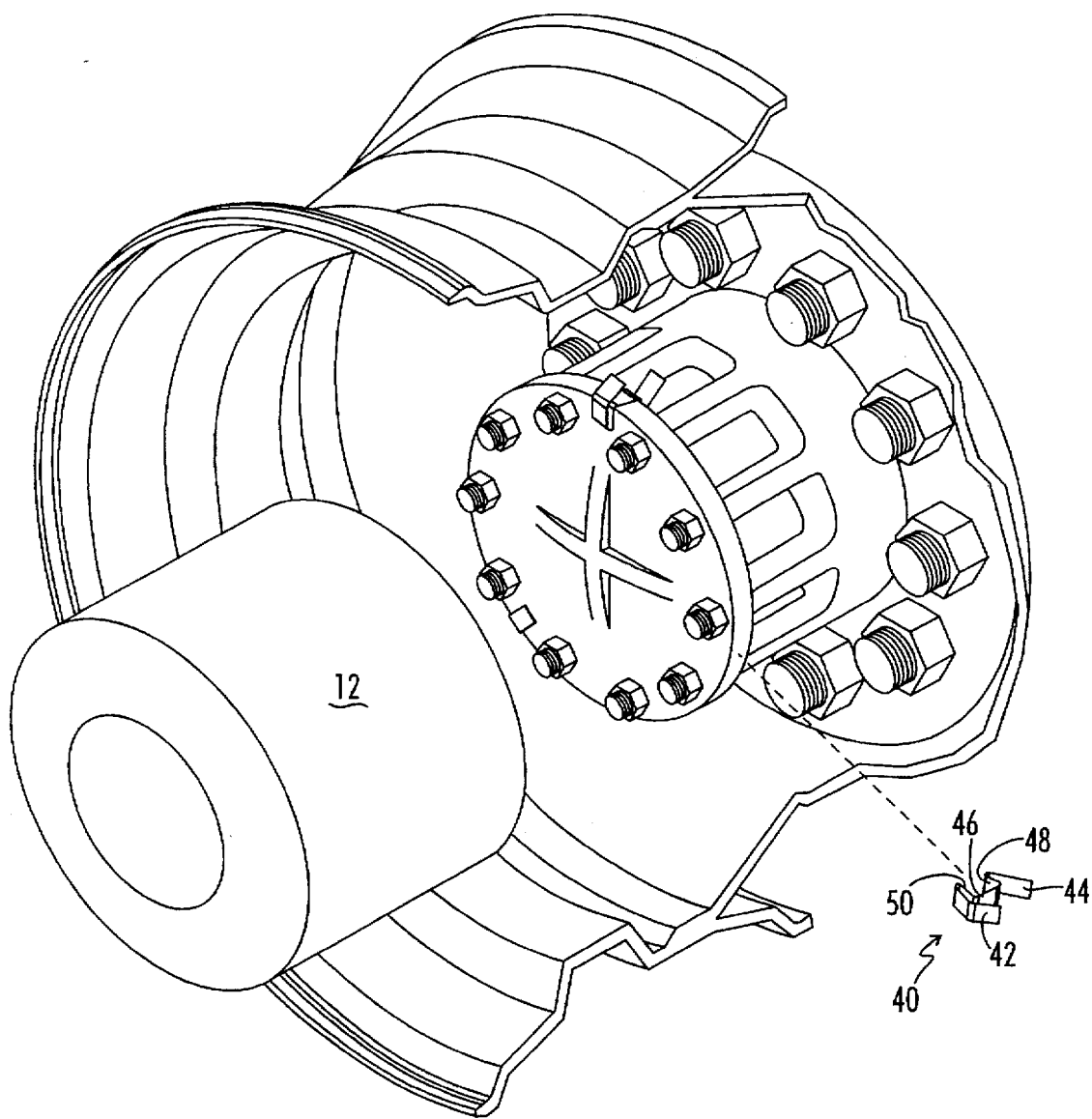
FIG. 6 is an exploded isometric view showing a third preferred embodiment of the present invention.
Figure 7:
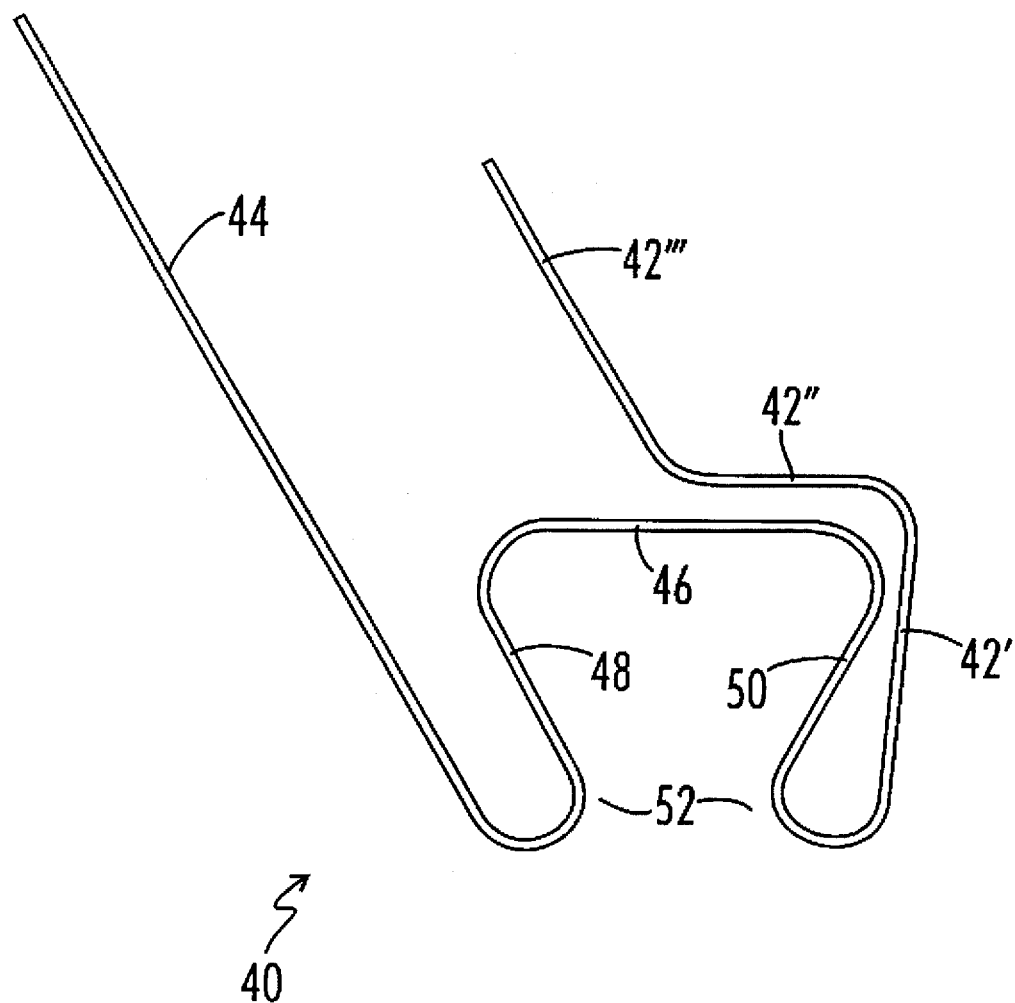
FIG. 7 is a plan view of the clip shown in FIG. 5.

Referring now to FIGS. 6 and 7, there is shown a second preferred embodiment of the present invention. This embodiment is used when hub 70 has lip 76. In this particular embodiment of the clip, clip 40 has opening 52 which is created by a combination of base 48, support 46, and web 50. Clip is biased in such a manner that opening 52 grasps lip 76. Additionally, spring clip 40 has finger 44 which is biased to engage wheel liner 12 An additional flange 42 can be added to provide improved attachment. In the preferred embodiment, finger is substantially 50.1 mm long. In the preferred embodiment, base 48 is substantially 8.9 mm. In the preferred embodiment, support is substantially 14.3 mm. In the preferred embodiment, web 50 is substantially 8.9 mm. In the preferred embodiment, flange 42 is broken down into three sections with first section 42' being substantially 14 mm, second section 42" being substantially 8 mm, and 42'" being substantially 18.1 mm.

Thus, although there have been described particular embodiments of the present invention of a new and useful device for attaching a wheel liner to a wheel having a hub cover, it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

We claim:

1. A device for attaching a hub cover to a wheel having a hub, said hub having a ring attached to a ridge by bolts, said device comprising:

a. plural spring clips, each of said plural spring clips having a finger and a base integrally joined by a support said;

b. a ring having plural orifices for receiving said bolts, said ring attached to said ridge;

c. said plural spring clips attached to said ridge by said ring; and d. said plural fingers frictionally attached to said inner wall of said hub cover.

2. A device for attaching a hub cover having an inner wall and an outer wall to a wheel having a hub, said hub having a ridge, said ridge having a lip, said device comprising:

a. plural spring clips, each of said spring clips having a finger joined to a web, said web joined to a support, said support joined to a base, said web and said support and said base creating an opening;

b. said opening of each of said spring clips releasibly attached to said lip of said hub; and c. said finger releasibly attached to said inner wall of said hub cover to said hub.

* * * * *